(12) United States Patent
Shibukawa et al.

(10) Patent No.: US 7,163,172 B2
(45) Date of Patent: Jan. 16, 2007

(54) REEL DRIVING DEVICE

(75) Inventors: Kazuo Shibukawa, Osaka (JP); Koichiro Hirabayashi, Osaka (JP); Akio Konishi, Hyogo (JP); Hiroshi Kurumatani, Hyogo (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 296 days.

(21) Appl. No.: 10/807,002

(22) Filed: Mar. 23, 2004

(65) Prior Publication Data

US 2004/0206843 A1    Oct. 21, 2004

(30) Foreign Application Priority Data

Mar. 24, 2003    (JP)    .............................. 2003-080272

(51) Int. Cl.
*G11B 15/32* (2006.01)

(52) U.S. Cl. ................ 242/355.1; 242/356.5

(58) Field of Classification Search ................ 242/355, 242/355.1, 356.5, 356.6, 356.7, 354; 360/85, 360/95, 96.3, 96.4, 96.5

See application file for complete search history.

(56) References Cited

U.S. PATENT DOCUMENTS

| | | | | |
|---|---|---|---|---|
| 4,917,328 A * | 4/1990 | Kobayashi et al. ......... | 242/355 |
| 5,398,882 A * | 3/1995 | Kim ......................... | 242/355.1 |
| 5,460,335 A * | 10/1995 | Jin .............................. | 242/355 |
| 5,511,737 A * | 4/1996 | Kang et al. ............... | 242/355.1 |
| 5,639,042 A * | 6/1997 | Chiu et al. ............... | 242/355.1 |
| 5,669,567 A * | 9/1997 | Chiu ......................... | 242/355 |
| 2003/0052208 A1* | 3/2003 | Seo et al. .................. | 242/355 |

* cited by examiner

*Primary Examiner*—William A. Rivera
(74) *Attorney, Agent, or Firm*—Renner, Otto, Boisselle & Sklar, LLP (57) ABSTRACT

A reel driving device includes a reel stand for driving a reel to rotate; and a latch including at least one contact portion contactable with the reel. The reel stand includes a convexed and concaved portion. The latch includes a claw portion for, when contacting the convexed and concaved portion, stopping a rotation of the convexed and concaved portion. While the reel stand rotates in a first direction, the latch moves in such a direction that the claw portion contacts the convexed and concaved portion by a rotation of the reel stand being conveyed to the at least one contact portion. While the reel stand rotates in a second direction, the latch moves in such a direction that the claw portion is separated from the convexed and concaved portion by a rotation of the reel stand being conveyed to the at least one contact portion.

10 Claims, 6 Drawing Sheets

RELATED ART

FIG.5

*RELATED ART*

FIG.6

REEL DRIVING DEVICE

This non-provisional application claims priority under 35 U.S.C., §119(a), on Patent Application No. 2003-080272 filed in Japan on Mar. 24, 2003, the entire contents of which are hereby incorporated by reference.

BACKGROUND OF THE INVENTION

1. Field of the Invention

The present invention relates to a reel driving device used in, for example, a magnetic recording and reproduction apparatus for performing information recording to and information reproduction from, a tape in the state where the tape is in contact with ahead. In particular, the present invention relates to a reel driving device used in, for example, a magnetic recording and reproduction apparatus for performing information recording to, and information reproduction from, a tape in the state where the tape, which has been pulled out from a cassette having built-in reels by tape pull-out members, is wound around a rotatable head cylinder over a prescribed angle.

2. Description of the Related Art

Recently, the size and cost reduction of magnetic recording and reproduction apparatuses used in video tape recorders and the like has been actively pursued. In accordance with this trend, the size and cost reduction of reel driving devices has been actively pursued.

Hereinafter, a conventional magnetic recording and reproduction apparatus described in Japanese Laid-Open Publication No. 63-94452 will be described.

Figure 5:
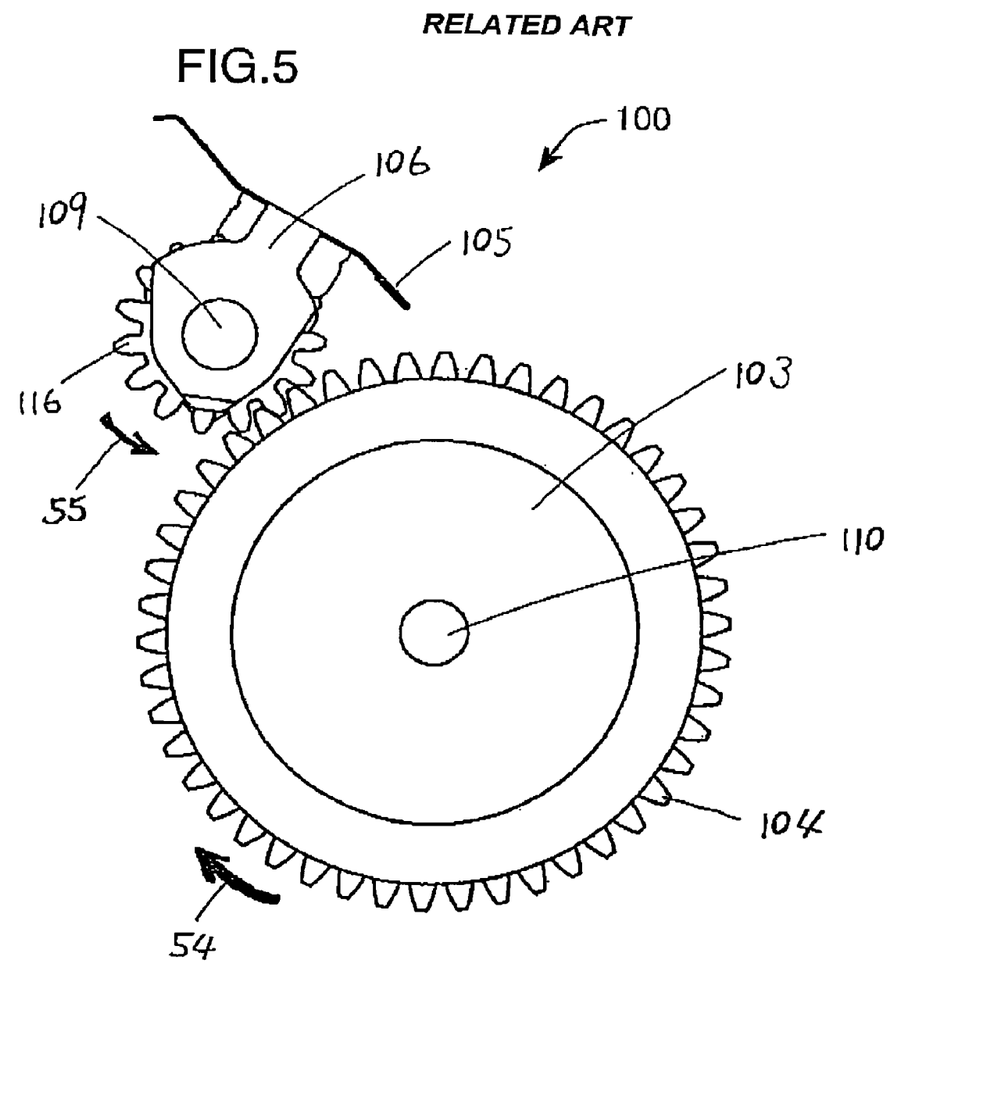
FIG. 5 is a plan view of a conventional reel driving device in a separation state.

FIG. 5 is a plan view of a conventional reel driving device 100 in the state where a claw portion 105 and a gear portion 104 are separated from each other. A latch gear 116 rotates in a direction represented by arrow 55, in accordance with which a latch 106 also rotates in the direction of arrow 55. Thus, the claw portion 105 is separated from the gear portion 104, which is a convexed and concaved portion provided around an outer circumference of a reel stand 103. As a result, the gear portion 104 becomes rotatable. Simultaneously, a driving force is conveyed from the latch gear 116 to the gear portion 104.

Figure 6:
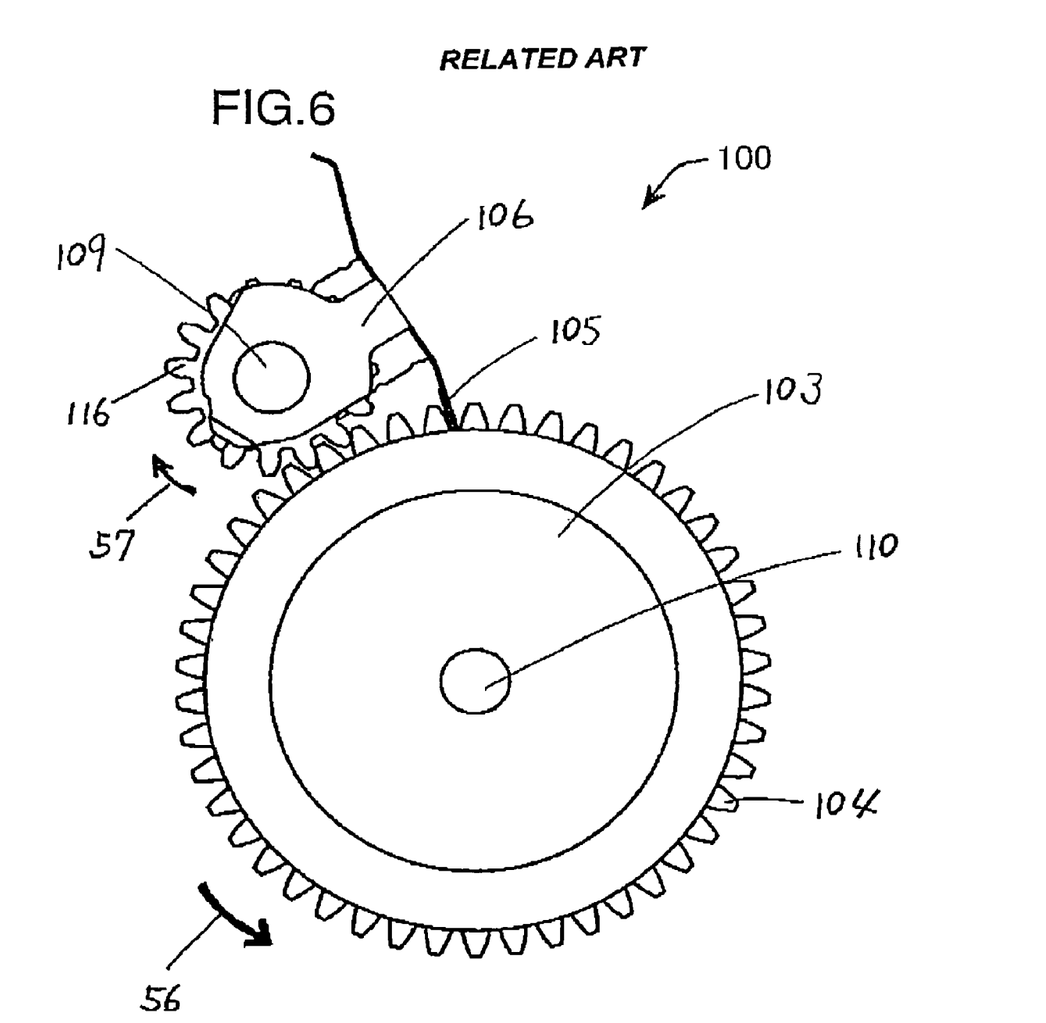
FIG. 6 is a plan view of the conventional reel driving device shown in FIG. 5 in a contact state.

FIG. 6 is a plan view of the reel driving device 100 shown in FIG. 5 in the state where the claw portion 105 and the gear portion 104 are in contact with each other. The reel stand 103 rotates in a direction represented by arrow 56, in accordance with which a driving force is conveyed from the gear portion 104 to the latch gear 116. Thus, the latch gear 116 and the latch 106 rotate in a direction represented by arrow 57. As a result, the claw portion 105 contacts the gear portion 104 and is engaged with the gear portion 104, thereby stopping the rotation of the gear portion 104.

The reel driving device 100 described above has the following problems.

The reel driving device 100 requires a space for the latch 106 and the latch gear 116, which makes it difficult to reduce the size of the reel driving device 100. The latch 106 and the latch gear 116 are separate components. Provision of the latch 106 and the latch gear 116 increases the number of components and also increases the cost for quality control since the latch 106 and the latch gear 116 need to be treated as one unit. Quality control is also required for the assembly of the unit, which also increases the cost of the reel driving device 100.

SUMMARY OF THE INVENTION

According to one aspect of the invention, a reel driving device includes a reel stand for driving a reel to rotate; and a latch including at least one contact portion contactable with the reel. The reel stand includes a convexed and concaved portion. The latch includes a claw portion for, when contacting the convexed and concaved portion, stopping a rotation of the convexed and concaved portion. While the reel stand rotates in a first direction, the latch moves in such a direction that the claw portion and the convexed and concaved portion contact each other by a rotation of the reel stand being conveyed to the at least one contact portion. While the reel stand rotates in a second direction, the latch moves in such a direction that the claw portion and the convexed and concaved portion are separated from each other by a rotation of the reel stand being conveyed to the at least one contact portion.

In one embodiment of the invention, a position of a rotation axis of the latch and a position of a rotation axis of the reel stand are different from each other.

In one embodiment of the invention, a rotation shaft of the reel stand is provided on a chassis. The chassis includes a contact portion which is point-contactable with the latch. The latch rotates with a position at which the contact portion of the chassis and the latch point-contact each other as a center of rotation.

In one embodiment of the invention, a rotation shaft of the reel stand is provided on a chassis. The chassis includes a projection which is point-contactable with the latch. The latch includes a recess which is point-contactable with the projection of the chassis. The latch rotates with a position at which the projection of the chassis and the recess of the latch point-contact each other as a center of rotation.

In one embodiment of the invention, a rotation shaft of the reel stand is provided on a chassis. The chassis includes a recess which is point-contactable with the latch. The latch includes a projection which is point-contactable with the recess of the chassis. The latch rotates with a position at which the recess of the chassis and the projection of the latch point-contact each other as a center of rotation.

In one embodiment of the invention, the latch includes three contact portions as the at least one contact portion. The latch includes an elastic portion for pressing the three contact portions to the reel stand. One of the three contact portions is integrally formed with the elastic portion.

In one embodiment of the invention, at least one of the at least one contact portion is located between a chassis having a rotation shaft of the reel stand provided thereon and the reel stand.

In one embodiment of the invention, all of the at least one contact portion is located between a chassis having a rotation shaft of the reel stand provided thereon and the reel stand.

In one embodiment of the invention, the latch includes an elastic portion for pressing the at least one contact portion to the reel stand.

According to another aspect of the invention, a reel driving device includes a reel stand for driving a reel to rotate; and a latch having at least one contact portion contactable with the reel. The reel stand includes a convexed and concaved portion. The latch includes a claw portion for, when contacting the convexed and concaved portion, stopping a rotation of the convexed and concaved portion. While the reel stand rotates in a first direction, the latch moves in such a direction that the claw portion and the convexed and concaved portion contact each other by a rotation of the reel stand being conveyed to the at least one contact portion. While the reel stand rotates in a second direction, the latch moves in such a direction that the claw portion and the convexed and concaved portion are separated from each other by a rotation of the reel stand being conveyed to the at least one contact portion. At least a portion of the latch is located between a chassis having a rotation shaft of the reel stand provided thereon and the reel stand.

Thus, the invention described herein makes possible the advantages of providing a compact, lost-cost, and high-quality reel driving device having a smaller number of components and requiring a smaller space.

These and other advantages of the present invention will become apparent to those skilled in the art upon reading and understanding the following detailed description with reference to the accompanying figures.

DESCRIPTION OF THE PREFERRED EMBODIMENTS

The present invention will be described by way of examples with reference to FIGS. 1 through 4.

Figure 1:
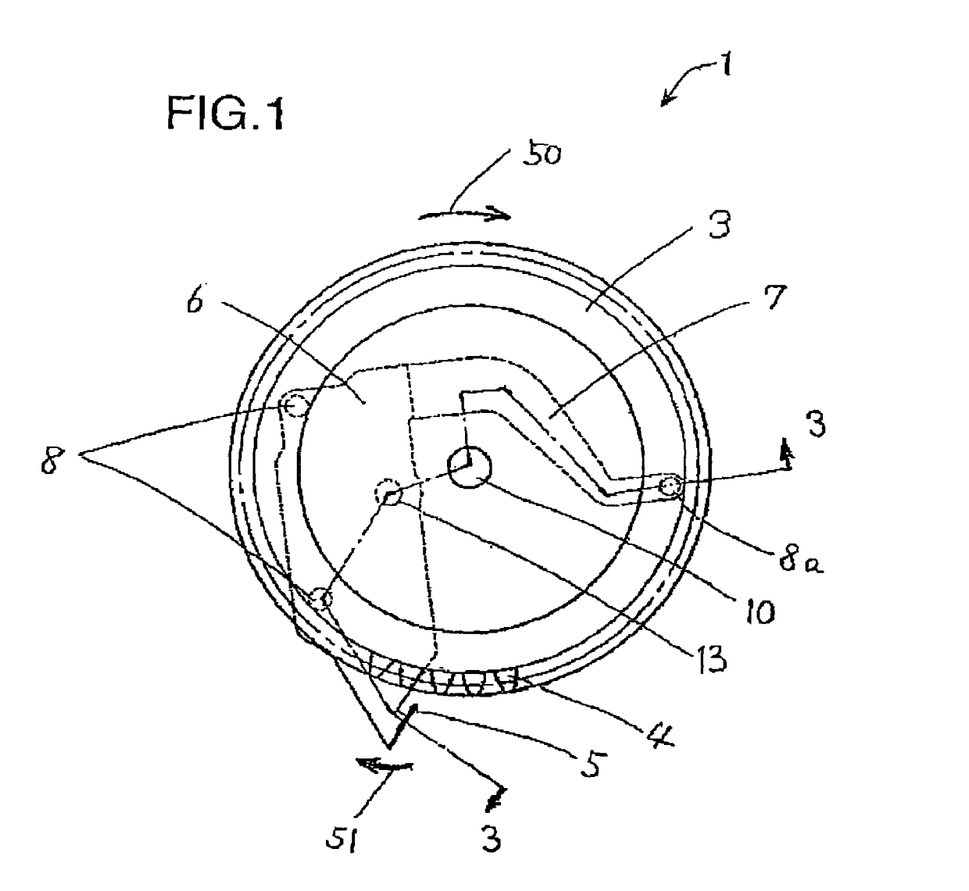
FIG. 1 is a plan view of a reel driving device according to the present invention in a separation state.

FIG. 1 is a plan view of a reel driving device 1 in one example according to the present invention. The reel driving device 1 is used for in, for example, a magnetic recording and reproduction apparatus for performing information recording to, and information reproduction from, a tape in the state where the tape, which has been pulled out from a cassette having built-in reels by tape pull-out members, is wound around a rotatable head cylinder over a prescribed angle.

The reel driving device 1 includes a reel stand 3 for driving a reel 21 (FIG. 3) built in a cassette to rotate, and a latch 6 including at least one contact portion 8 which is contactable with the reel stand 3. In this example, the latch 6 includes three contact portions 8. One of the three contact portions 8 is included in an elastic portion 7 (described later) and is represented by reference numeral 8a. The reel stand 3 includes a gear portion 4, which is a convexed and concaved portion provided around an outer circumference of the reel stand 3. The latch 6 includes a claw portion 5 for stopping the rotation of the gear portion 4 when contacting the gear portion 4.

While the reel stand 3 rotates in a direction represented by arrow 52 (FIG. 2), the rotation of the reel stand 3 is conveyed to the contact portions 8 and 8a, and as a result, the latch 6 moves in a direction represented by arrow 53 (FIG. 2) to cause the claw portion 5 and the gear portion 4 to contact each other. While the reel stand 3 rotates in a direction represented by arrow 50 (FIG. 1), the rotation of the reel stand 3 is conveyed to at least one of the contact portions 8 and 8a, and as a result, the latch 6 moves in a direction represented by arrow 51 (FIG. 1) to cause the claw portion 5 and the gear portion 4 to separate from each other.

Figure 2:
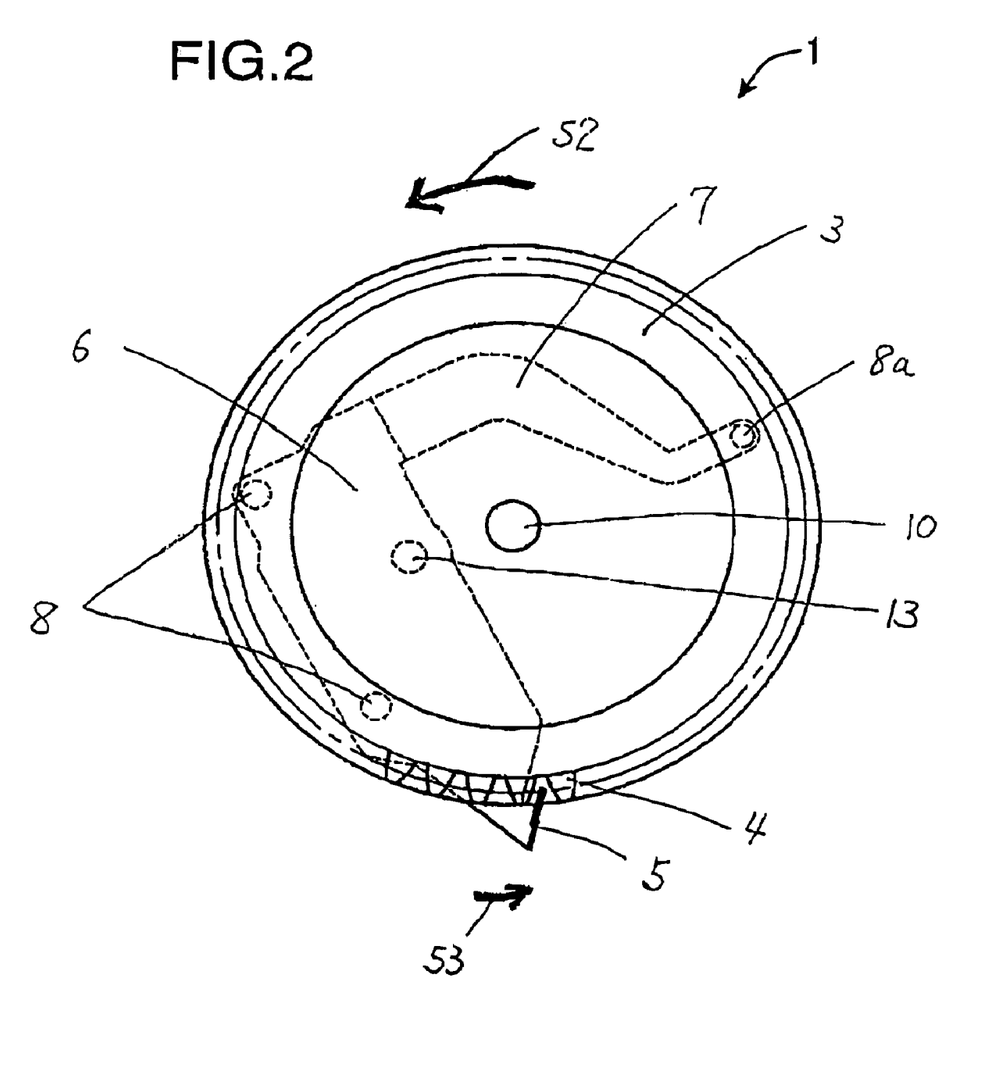
FIG. 2 is a plan view of the reel driving device shown in FIG. 1 in a contact state.
Figure 3:
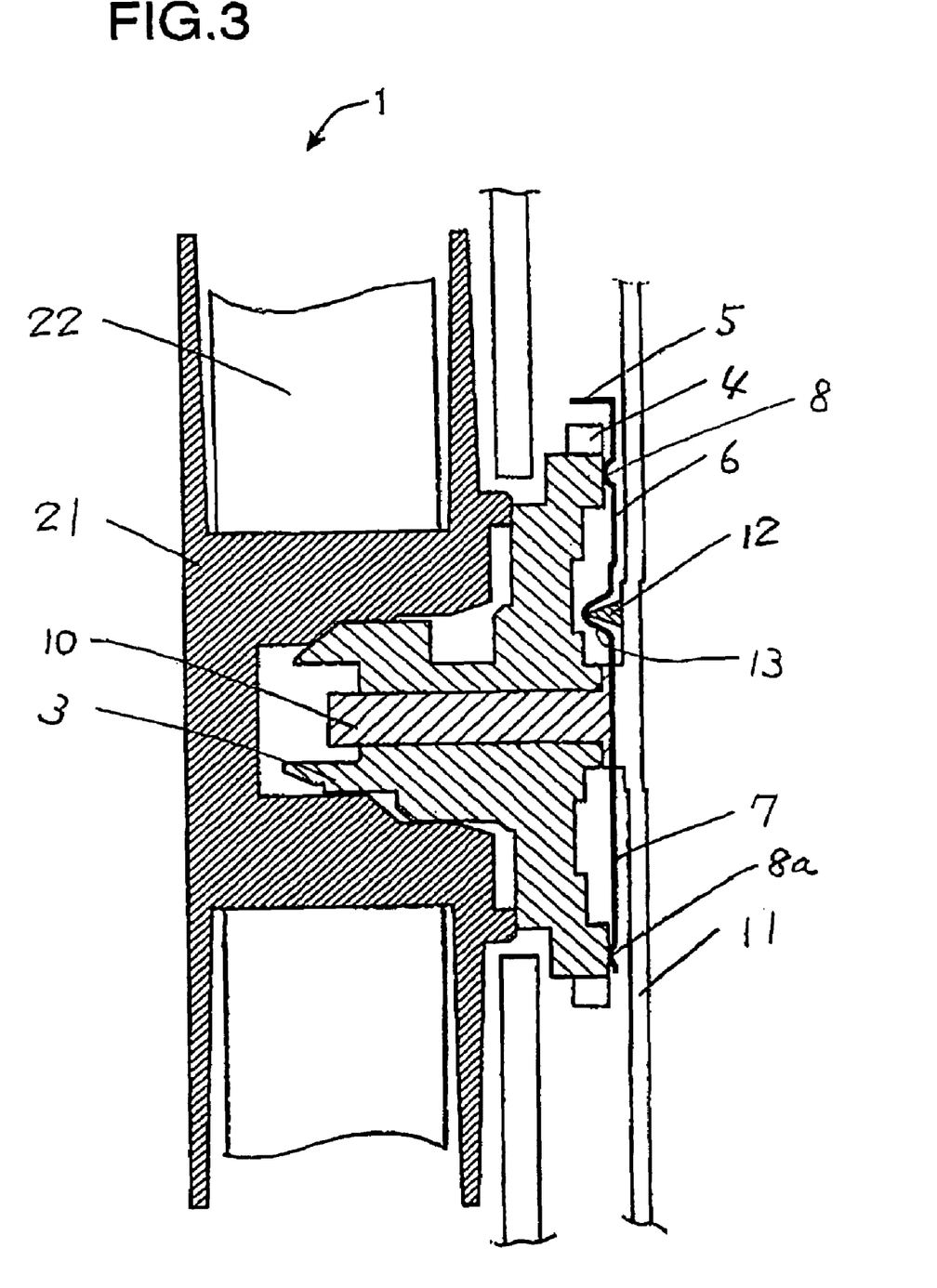
FIG. 3 is a cross-sectional view of the reel driving device taken along one-dot chain line 3—3 in FIG. 1.

FIG. 1 shows a separation state of the reel drive device 1, i.e., in a state where the claw portion 5 and the gear portion 4 are separated from each other. FIG. 2 is a plan view of the reel drive device 1 in a contact state, i.e., in a state where the claw portion 5 and the gear portion 4 contact each other. FIG. 3 is a cross-sectional view of the reel drive device 1 taken along line 3—3.

When a cassette is mounted on, for example, a magnetic recording and reproduction apparatus (not shown), the reel stand 3 is engaged with the reel 21 of the cassette. The claw portion 5 is integrally formed with the latch 6. The elastic portion 7 is included in the latch 6 and presses the contact portions 8 and 8a to the reel stand 3. The contact portion 8a is integrally included in the elastic portion 7. The contact portions 8 and 8a, as well as the claw portion 5, are contactable with the reel stand 3. A position of a rotation axis of the latch 6 and a position of a rotation axis of the reel stand 3 (i.e., a rotation shaft 10) are different from each other.

With reference to FIG. 3, the rotation shaft 10 of the reel stand 3 is provided on a chassis 11 of the magnetic recording and reproduction apparatus. A projection 12 which is substantially point-contactable with the latch 6 is provided on the chassis 11. The projection 12 is integrally formed with the chassis 11. A recess 13 which is substantially point-contactable with the projection 12 is included in the latch 6. The recess 13 is integrally formed with the latch 6. The latch 6 rotates with a position at which the projection 12 and the recess 13 substantially point-contact each other as the center of rotation. Namely, the projection 12 and the recess 13 form the rotation axis of the latch 6.

At least a portion of the latch 6 is located below the reel stand 3 (i.e., between the reel stand 3 and the chassis 11), and the latch 6 is urged toward the reel stand 3 at the three contact portions 8 and 8a by a force from the elastic portion 7. Portions of the reel stand 3 with which the contact portions 8 and 8a are contactable are formed of a material which is highly abrasion resistant with a low friction coefficient. A reaction force of the force from the elastic portion 7 urges the recess 13 toward the chassis 11. At least one of the contact portions 8 and 8a is located between the reel stand 3 and the chassis 11. The entirety of the latch 6, excluding the claw portion 5, is located below the reel stand 3. The contact portions 8 and 8a are located below the reel stand 3. Namely, the latch 6 is located in a small space between the reel stand 3 and the chassis 11. When seen from the top of the reel driving device 1, the latch 6 is not outside the reel stand 3 except for the claw portion 5.

In this example, the latch 6 is of a leaf spring type and integrally includes the claw portion 5, the contact portions 8 and 8a, the elastic portion 7, and the recess 13.

Figure 4:
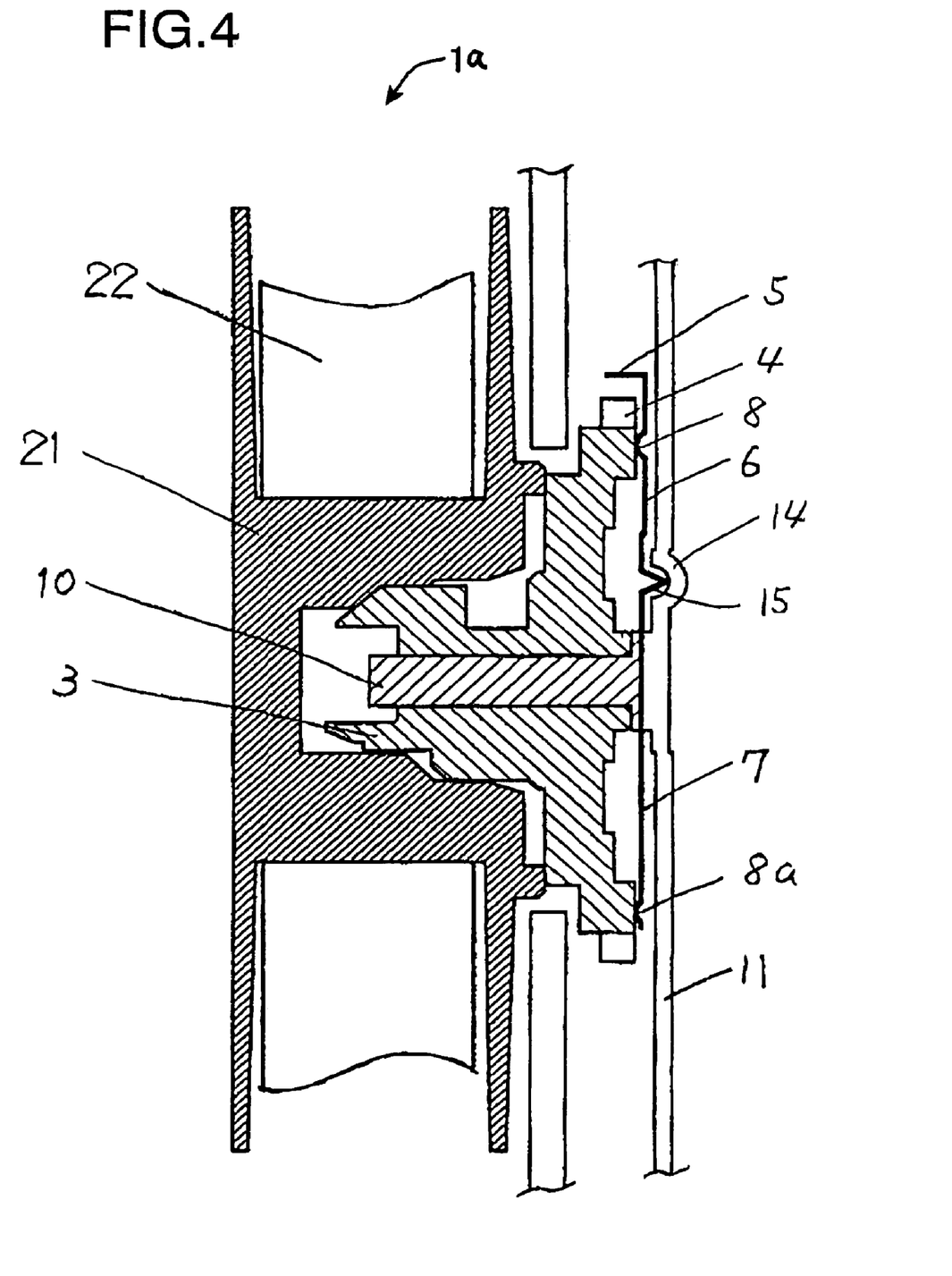
FIG. 4 is a cross-sectional view of a modification of the reel driving device shown in FIGS. 1 and 2.

FIG. 4 is a cross-sectional view of a reel driving device 1a as a modification of the reel driving device 1 shown in FIG. 3. The cross-sectional view of FIG. 4 is taken along a line corresponding to one-dot chain line 3—3 shown in FIG. 1. A recess 14 which is substantially point-contactable with the latch 6 is formed in the chassis 11. The recess 14 is integrally formed with the chassis 11. A projection 15 which is substantially point-contactable with the recess 14 is included in the latch 6. The projection 15 is integrally formed with the latch 6. The latch 6 rotates with a position at which the recess 14 and the projection 15 substantially point-contact each other as the center of rotation, (Namely, the recess 14 and the projection 15 form the rotation axis of the latch 6.)

In the modification shown in FIG. 4, the chassis 11 includes the recess 14, and the latch 6 includes the projection 15, which is opposite to the structure shown in FIG. 3. The effect provided by the structure shown in FIG. 4 is the same as that provided by the structure shown in FIG. 3.

An operation of the reel driving device 1 will be further described. With reference to FIG. 1, the separation state of the reel driving device 1 in which the claw portion 5 and the gear portion 4 are separated from each other will be described.

A rotation of an idler gear (not shown) is conveyed to the reel stand 3 via the gear portion 4, and the reel stand 3 rotates in the direction of arrow 50. The latch 6 rotates in the direction of arrow 51 about the rotation axis thereof by a friction force generated between the reel stand 3 and the contact portions 8 and 8a. The rotation of the latch 6 separates the claw portion 5 from the gear portion 4. At this point, the latch 6 and the chassis 11 are substantially in point contact with each other at the position of the rotation axis of the latch 6. Therefore, the friction torque which prevents the rotation of the latch 6 is substantially zero, and thus the latch 6 rotates with certainty. The latch 6, after rotating in the direction of arrow 51 over a prescribed angle, contacts the stopper (not shown) and is stopped while the claw portion 5 and the gear portion 4 are kept separated from each other. While the latch 6 is stopped in this state and the rotation force of the idler gear is conveyed to the reel stand 3, the reel stand 3 continues rotating while receiving a friction force from the contact portions 8 and 8a, thereby rotating the reel stand 3 and taking in a tape 22.

With reference to FIG. 2, the contact state of the reel driving device 1 in which the claw portion 5 and the gear portion 4 are in contact with each other will be described.

While the tape 22 is supplied from the reel 21, another reel (not shown) built in the cassette takes in the tape 22, and thus the reel 21 rotates. In accordance with the rotation of the reel 21, the reel stand 3 in engagement with the reel 21 rotates in the direction of arrow 52. By a friction force generated between the reel stand 3 and the contact portions 8 and 8a, the latch 6 rotates in the direction of arrow 53 with the rotation axis of the latch 6 as the center of rotation. The rotation of the latch 6 causes the claw portion 5 to contact the gear portion 4. At this point, the latch 6 and the chassis 11 are substantially in point contact with each other at the position of the rotation axis of the latch 6. Therefore, the friction torque which prevents the rotation of the latch 6 is substantially zero, and thus the latch 6 rotates with certainty. By the claw portion 5 contacting the gear portion 4, the latch 6 is stopped while the claw portion 5 and the gear portion 4 are kept in contact with each other. By the claw portion 5 contacting the gear portion 4, the claw portion 5 stops the rotation of the gear portion 4.

In this example, the reel stand 3 includes a torque limiter (not shown). The tape 22 is supplied from the reel 21 in the state where the rotation of the gear portion 4 is stopped and an appropriate tension is applied to the tape 22 by the torque limiter. While the tape 22 is supplied from the reel 21, idler gear is separated from the reel stand 3 and thus the rotation of the idler gear is not conveyed to the gear portion 4.

The above-described operation is the same for the reel driving device 1a shown in FIG. 4, which is a modification of the reel driving device 1.

In this example, the entirety of the latch 6, excluding the claw portion 5, is located below the reel stand 3. The contact portions 8 and 8a are located below the reel stand 3. Namely, the latch 6 is located in a small space between the reel stand 3 and the chassis 11. When seen from the top of the reel driving device 1, the latch 6 is not outside the reel stand 3 except for the claw portion 5. The contact portions 8 and 8a are not outside the reel stand 3. Owing to such a structure, the size reduction of the reel driving device 1 can be realized.

Since the latch 6 and the chassis 11 are substantially in point contact with each other at the position of the rotation axis of the latch 6, the friction torque which prevents the rotation of the latch 6 is substantially zero. Thus, a high performance reel driving device, in which the claw portion 5 and the gear portion 4 contact and are separated from each other with certainty, is realized at low cost.

Since the latch 6 and the chassis 11 are substantially in point contact with each other at the position of the rotation axis of the latch 6, the friction torque which prevents the rotation of the latch 6 is substantially zero. Therefore, the portions of the reel stand 3 with which the contact portions 8 and 8a are contactable can be formed of a material which is highly abrasion resistant with a low friction coefficient. This provides the effect of extending the life of the reel driving device 1. In other words, a long-life, high-performance reel driving device is obtained.

The latch 6 is of a leaf spring type and integrally includes the claw portion 5, the contact portions 8 and 8a, the elastic portion 7, and the recess 13 (or the projection 14). The projection 12 (or the recess 14) of the chassis 11 is integrally formed with the chassis 11. Since the reel driving device 1 includes a small number of components, the reel driving device 1 is compact and low-cost and provides high performance.

Since the latch gear 116 shown in FIG. 5 is not necessary according to the present invention, the power consumption and the noise occurred by the rotation of the reel stand can be reduced.

In the above example, the latch 6 is of a leaf spring type. Alternatively, the latch 6 may be formed of any material acting as a spring. The recess 14 of the chassis 11 and the recess 13 of the latch 6 may be like a hole. The projection 12 of the chassis 11 and the projection 15 of the latch 6 may have a shape of a shaft. The convexed and concaved portion of the reel stand 3 which to contactable with the claw portion 5 is not limited to the gear portion 4, and may be any portion of the reel stand 3 as long as it is engageable with the claw portion 5.

A reel driving device according to the present invention includes a reel stand for driving a reel to rotate; and a latch including at least one contact portion contactable with the reel. The reel stand includes a convexed and concaved portion. The latch includes a claw portion for, when contacting the convexed and concaved portion, stopping a rotation of the convexed and concaved portion. While the reel stand rotates in a first direction, the latch moves in such a direction that the claw portion and the convexed and concaved portion contact each other by a rotation of the reel stand being conveyed to the at least one contact portion. While the reel stand rotates in a second direction, the latch moves in such a direction that the claw portion and the convexed and concaved portion are separated from each other by a rotation of the reel stand being conveyed to the at least one contact portion.

Since the rotation of the reel stand is conveyed to the latch via the contact portion, not the claw portion, the claw portion may be contactable or separable from the convexed and concaved portion of the reel stand. Thus, a low-cost reel driving device is obtained. The latch may be formed of only a leaf spring. This allows the contacting and separation operation of the claw portion to be performed by a single component, and also allows the latch to be located between the reel stand and the chassis. Thus, a compact, low-cost, and high-performance reel driving device is obtained.

In one embodiment of the invention, a position of a rotation axis of the latch and a position of a rotation axis of the reel stand are different from each other.

Since the rotation of the reel stand is conveyed to the latch, the contacting and separation operation of the claw portion of the latch and the convexed and concaved portion of the reel stand is easily realized. Thus, a low-cost and high-performance reel driving device is obtained.

In one embodiment of the invention, a rotation shaft of the reel stand is provided on a chassis. The chassis includes a contact portion which is point-contactable with the latch. The latch rotates with a position at which the contact portion of the chassis and the latch point-contact each other as a center of rotation.

Owing to such a structure, the friction torque which prevents the rotation of the latch is substantially zero, and thus the latch rotates with certainty. Thus, a low-cost and high-performance reel driving device is obtained.

In one embodiment of the invention, a rotation shaft of the reel stand is provided on a chassis. The chassis includes a projection which is point-contactable with the latch. The latch includes a recess which is point-contactable with the projection of the chassis. The latch rotates with a position at which the projection of the chassis and the recess of the latch point-contact each other as a center of rotation.

Owing to such a structure, the point-contact between the chassis and the latch is easily realized. Thus, a low-cost and high-performance reel driving device is obtained.

In one embodiment of the invention, a rotation shaft of the reel stand is provided on a chassis. The chassis includes a recess which is point-contactable with the latch. The latch includes a projection which is point-contactable with the recess of the chassis. The latch rotates with a position at which the recess of the chassis and the projection of the latch point-contact each other as a center of rotation.

Owing to such a structure, the point-contact between the chassis and the latch is easily realized. Thus, a low-cost and high-performance reel driving device is obtained.

In one embodiment of the invention, the latch includes three contact portions as the at least one contact portion. The latch includes an elastic portion for pressing the three contact portions to the reel stand. One of the three contact portions is integrally formed with the elastic portion.

By forming the latch and the elastic portion integrally, the number of components is reduced and the orientation of the latch can be stabilized. Thus, a low-cost and high-performance reel driving device is obtained.

In one embodiment of the invention, at least one of the at least one contact portion is located between a chassis having a rotation shaft of the reel stand provided thereon and the reel stand. Alternatively, all of the at least one contact portion is located between a chassis having a rotation shaft of the reel stand provided thereon and the reel stand.

Owing to such a structure, the space can be saved, and a compact reel driving device is obtained.

In one embodiment of the invention, the latch includes an elastic portion for pressing the at least one contact portion to the reel stand.

By forming the latch and the elastic portion integrally, the number of components is reduced and the orientation of the latch can be stabilized. Thus, a low-cost and high-performance reel driving device is obtained.

According to another aspect of the invention, a reel driving device includes a reel stand for driving a reel to rotate; and a latch having at least one contact portion contactable with the reel. The reel stand includes a convexed and concaved portion. The latch includes a claw portion for, when contacting the convexed and concaved portion, stopping a rotation of the convexed and concaved portion. While the reel stand rotates in a first direction, the latch moves in such a direction that the claw portion and the convexed and concaved portion contact each other by a rotation of the reel stand being conveyed to the at least one contact portion. While the reel stand rotates in a second direction, the latch moves in such a direction that the claw portion and the convexed and concaved portion are separated from each other by a rotation of the reel stand being conveyed to the at least one contact portion. At least a portion of the latch is located between a chassis having a rotation shaft of the reel stand provided thereon and the reel stand.

Owing to such a structure, the space can be saved, and a compact reel driving device is obtained.

As described above, according to the present invention, a compact, low-cost, and high-performance reel driving device is provided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A reel driving device, comprising:
a reel stand for driving a reel to rotate; and
a latch including at least one contact portion contactable with the reel;
wherein:
the reel stand includes a convexed and concaved portion;
the latch includes a claw portion for, when contacting the convexed and concaved portion, stopping a rotation of the convexed and concaved portion;
while the reel stand rotates in a first direction, the latch moves in such a direction that the claw portion and the convexed and concaved portion contact each other by a rotation of the reel stand being conveyed to the at least one contact portion; and
while the reel stand rotates in a second direction, the latch moves in such a direction that the claw portion and the convexed and concaved portion are separated from each other by a rotation of the reel stand being conveyed to the at least one contact portion.

2. A reel driving device according to claim 1, wherein a position of a rotation axis of the latch and a position of a rotation axis of the reel stand are different from each other.

3. A reel driving device according to claim 2, wherein:
a rotation shaft of the reel stand is provided on a chassis;
the chassis includes a contact portion which is point-contactable with the latch; and
the latch rotates with a position at which the contact portion of the chassis and the latch point-contact each other as a center of rotation.

4. A reel driving device according to claim 2, wherein:
a rotation shaft of the reel stand is provided on a chassis;
the chassis includes a projection which is point-contactable with the latch;
the latch includes a recess which is point-contactable with the projection of the chassis;
the latch rotates with a position at which the projection of the chassis and the recess of the latch point-contact each other as a center of rotation.

5. A reel driving device according to claim 2, wherein:
a rotation shaft of the reel stand is provided on a chassis;

the chassis includes a recess which is point-contactable with the latch;

the latch includes a projection which is point-contactable with the recess of the chassis;

the latch rotates with a position at which the recess of the chassis and the projection of the latch point-contact each other as a center of rotation.

6. A reel driving device according to claim 1, wherein:

the latch includes three contact portions as the at least one contact portion;

the latch includes an elastic portion for pressing the three contact portions to the reel stand; and one of the three contact portions is integrally formed with the elastic portion.

7. A reel driving device according to claim 1, wherein at least one of the at least one contact portion is located between a chassis having a rotation shaft of the reel stand provided thereon and the reel stand.

8. A reel driving device according to claim 1, wherein all of the at least one contact portion is located between a chassis having a rotation shaft of the reel stand provided thereon and the reel stand.

9. A reel driving device according to claim 1, wherein the latch includes an elastic portion for pressing the at least one contact portion to the reel stand.

10. A reel driving device, comprising:

a reel stand for driving a reel to rotate; and a latch having at least one contact portion contactable with the reel;

wherein:

the reel stand includes a convexed and concaved portion;

the latch includes a claw portion for, when contacting the convexed and concaved portion, stopping a rotation of the convexed and concaved portion;

while the reel stand rotates in a first direction, the latch moves in such a direction that the claw portion and the convexed and concaved portion contact each other by a rotation of the reel stand being conveyed to the at least one contact portion;

while the reel stand rotates in a second direction, the latch moves in such a direction that the claw portion and the convexed and concaved portion are separated from each other by a rotation of the reel stand being conveyed to the at least one contact portion; and at least a portion of the latch is located between a chassis having a rotation shaft of the reel stand provided thereon and the reel stand.

* * * * *